US012566677B1

(12) United States Patent
Janssen et al.

(10) Patent No.: US 12,566,677 B1
(45) Date of Patent: Mar. 3, 2026

(54) AUTOMATED RECIPE GENERATION FOR ORCHESTRATED APPLICATION RECOVERY

(71) Applicant: International Business Machines Corporation, Armonk, NY (US)

(72) Inventors: Travis Janssen, San Jose, CA (US); Brian D. Hatfield, Tucson, AZ (US); Paul Henri Muench, San Jose, CA (US); Runyu Jin, San Diego, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/822,937

(22) Filed: Sep. 3, 2024

(51) Int. Cl.
G06F 11/14        (2006.01)
G06F 11/1446      (2026.01)

(52) U.S. Cl.
CPC ...... *G06F 11/1469* (2013.01); *G06F 2201/80* (2013.01)

(58) Field of Classification Search
CPC ............. G06F 11/1469; G06F 2201/80; G06F 16/9027; G06N 20/20; G06N 5/01
See application file for complete search history.

(56) References Cited

U.S. PATENT DOCUMENTS

| | | | |
|---|---|---|---|
| 7,945,537 B2 | 5/2011 | Balasubramanian et al. | |
| 7,992,031 B2 | 8/2011 | Chavda et al. | |
| 8,015,430 B1 | 9/2011 | Rakic et al. | |
| 8,121,966 B2 | 2/2012 | Routray et al. | |
| 9,183,097 B2 | 11/2015 | Tarves, Jr. et al. | |
| 11,403,165 B2 | 8/2022 | Madawat et al. | |
| 11,663,093 B2 | 5/2023 | Wu | |
| 2023/0080046 A1* | 3/2023 | Paul ...................... | G06F 16/128 707/822 |
| 2023/0195539 A1* | 6/2023 | Pabón ..................... | G06F 9/541 719/328 |

FOREIGN PATENT DOCUMENTS

EP            3362899 A1      8/2018

OTHER PUBLICATIONS

Torres, Enterprise app sprawl swells, with most apps outside of IT control, Sep. 20, 2021, https://www.ciodive.com/news/app-sprawl-saas-data-shadow-it-productiv/606872/.
Github, RamenDR_Recipe, 2024, https://github.com/RamenDR/recipe.
Github, RamenDR_Ramen, 2024, https://github.com/RamenDR/ramen.

* cited by examiner

*Primary Examiner* — Apu M Mofiz
*Assistant Examiner* — Cindy Nguyen
(74) *Attorney, Agent, or Firm* — Garg Law Firm, PLLC; Rakesh Garg; Michael O'Keefe

(57)        ABSTRACT

A selected recipe operating successfully on the second orchestration container for a transferred target application is confirmed. The recipes for transferring the target application to the second orchestration container are formed. The recipe for transferring the target application to the second orchestration container is executed. The recipe for transferring the target application to the second orchestration container is re-executed. A selected recipe based on a determination that the selected recipe meets or exceeds a threshold for operation on the second orchestration container.

22 Claims, 9 Drawing Sheets

*Fig. 3A*

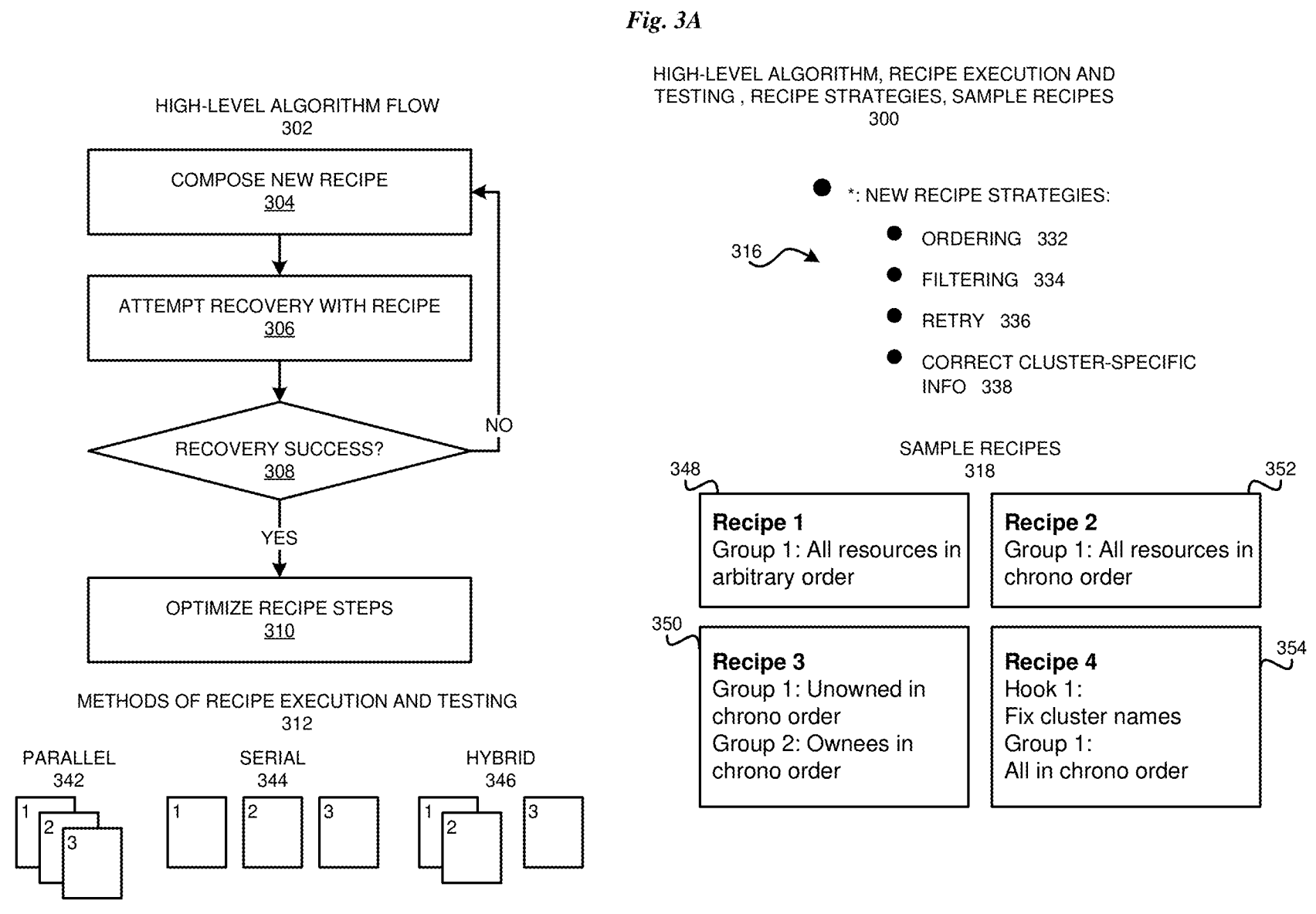

HIGH-LEVEL ALGORITHM, RECIPE EXECUTION AND TESTING , RECIPE STRATEGIES, SAMPLE RECIPES
300

● *: NEW RECIPE STRATEGIES:

316

● ORDERING   332

● FILTERING   334

● RETRY   336

● CORRECT CLUSTER-SPECIFIC INFO   338

SAMPLE RECIPES
318

Recipe 1
Group 1: All resources in arbitrary order
348

Recipe 2
Group 1: All resources in chrono order
352

Recipe 3
Group 1: Unowned in chrono order
Group 2: Ownees in chrono order
350

Recipe 4
Hook 1:
Fix cluster names
Group 1:
All in chrono order
354

HIGH-LEVEL ALGORITHM FLOW
302

COMPOSE NEW RECIPE
304

→

ATTEMPT RECOVERY WITH RECIPE
306

→

RECOVERY SUCCESS?
308

— NO →

— YES →

OPTIMIZE RECIPE STEPS
310

METHODS OF RECIPE EXECUTION AND TESTING
312

PARALLEL
342
[1] [2] [3]

SERIAL
344
[1] [2] [3]

HYBRID
346
[1] [2] [3]

*Fig. 4*

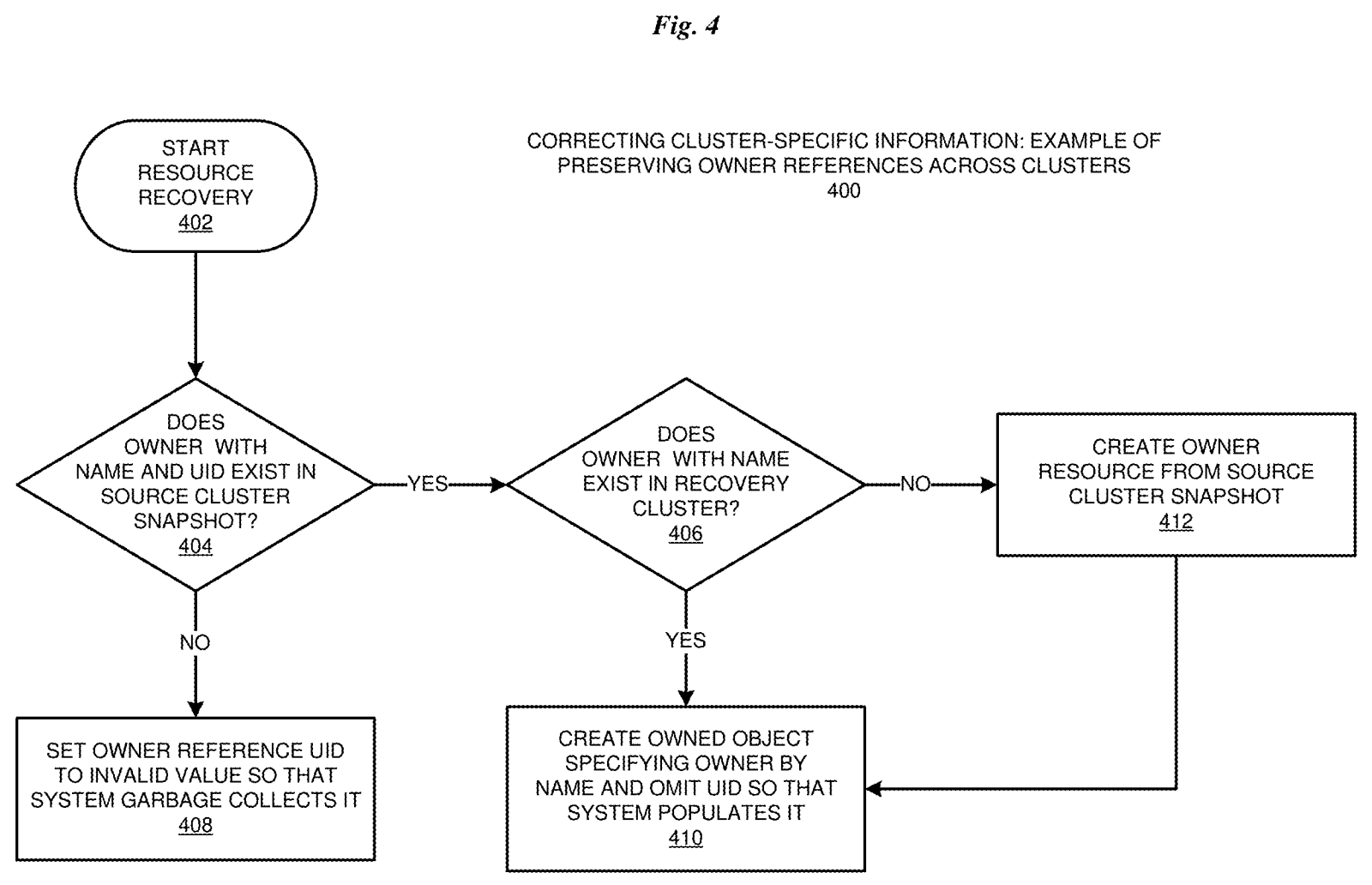

CORRECTING CLUSTER-SPECIFIC INFORMATION: EXAMPLE OF PRESERVING OWNER REFERENCES ACROSS CLUSTERS
400

START RESOURCE RECOVERY
402

DOES OWNER WITH NAME AND UID EXIST IN SOURCE CLUSTER SNAPSHOT?
404

NO → SET OWNER REFERENCE UID TO INVALID VALUE SO THAT SYSTEM GARBAGE COLLECTS IT
408

YES →

DOES OWNER WITH NAME EXIST IN RECOVERY CLUSTER?
406

NO → CREATE OWNER RESOURCE FROM SOURCE CLUSTER SNAPSHOT
412

YES → CREATE OWNED OBJECT SPECIFYING OWNER BY NAME AND OMIT UID SO THAT SYSTEM POPULATES IT
410

*Fig. 5*

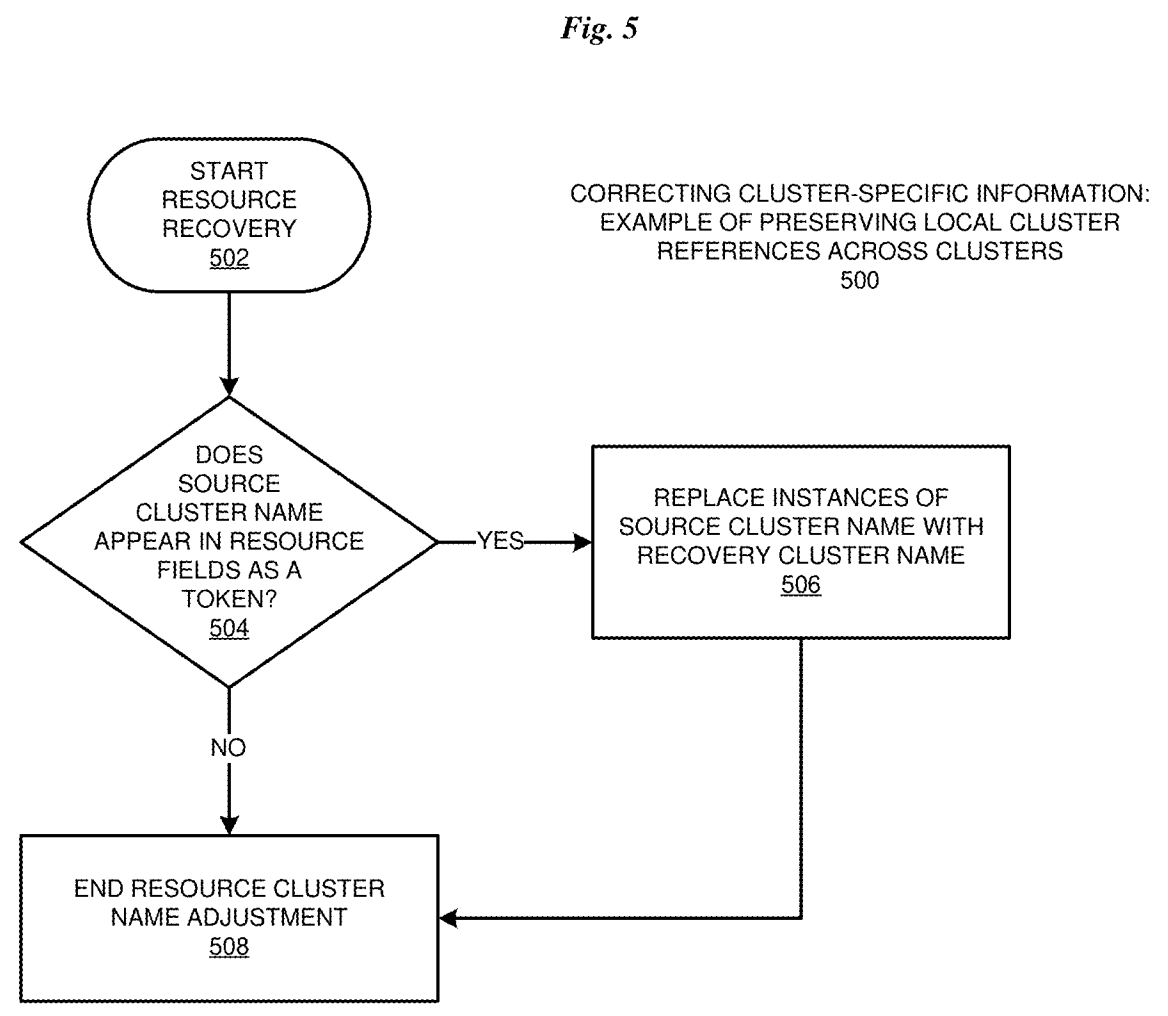

CORRECTING CLUSTER-SPECIFIC INFORMATION:
EXAMPLE OF PRESERVING LOCAL CLUSTER
REFERENCES ACROSS CLUSTERS
500

START
RESOURCE
RECOVERY
502

DOES
SOURCE
CLUSTER NAME
APPEAR IN RESOURCE
FIELDS AS A
TOKEN?
504

YES

REPLACE INSTANCES OF
SOURCE CLUSTER NAME WITH
RECOVERY CLUSTER NAME
506

NO

END RESOURCE CLUSTER
NAME ADJUSTMENT
508

*Fig. 6*

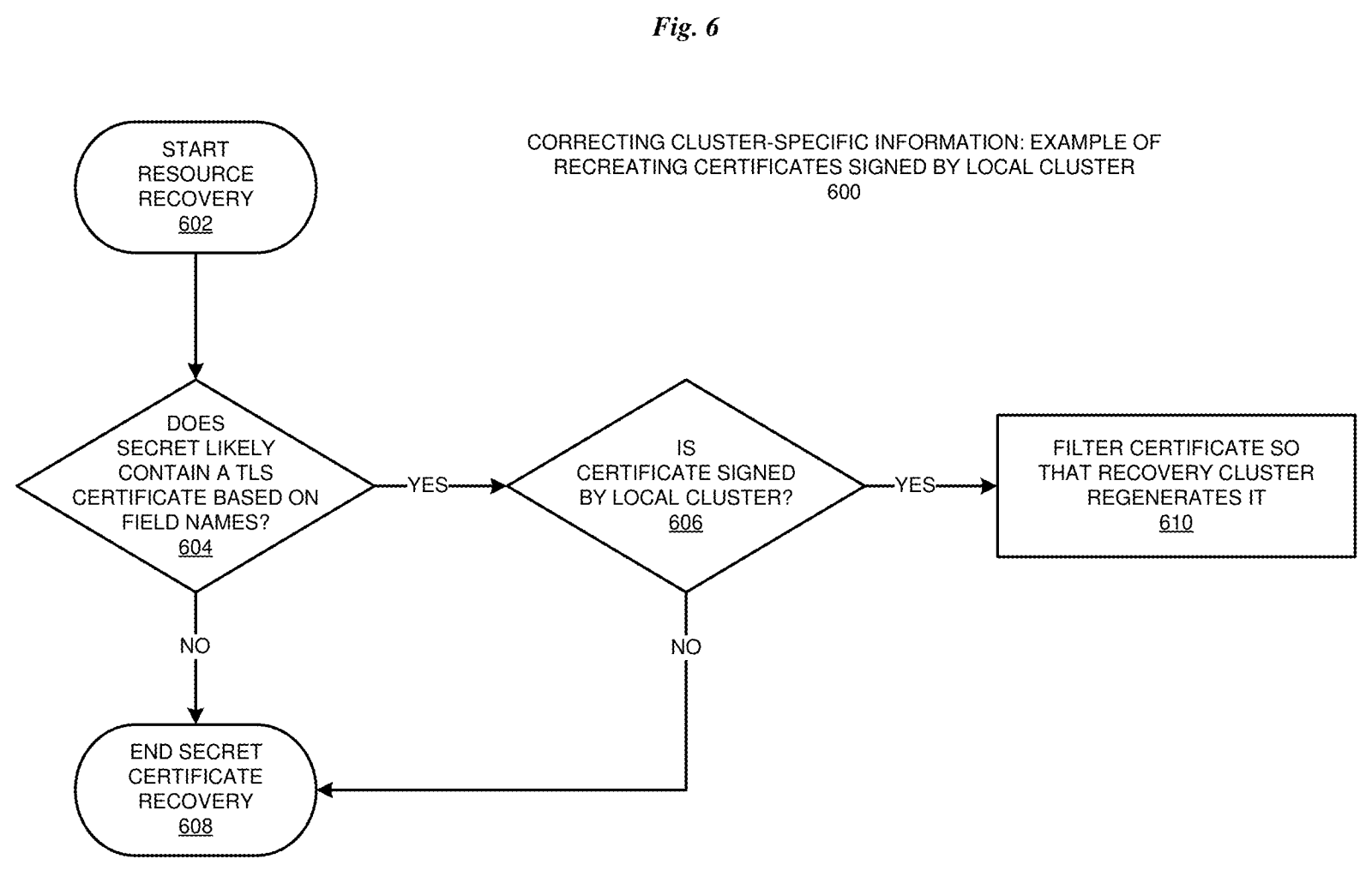

CORRECTING CLUSTER-SPECIFIC INFORMATION: EXAMPLE OF
RECREATING CERTIFICATES SIGNED BY LOCAL CLUSTER
600

START
RESOURCE
RECOVERY
602

DOES
SECRET LIKELY
CONTAIN A TLS
CERTIFICATE BASED ON
FIELD NAMES?
604

YES

IS
CERTIFICATE SIGNED
BY LOCAL CLUSTER?
606

YES

FILTER CERTIFICATE SO
THAT RECOVERY CLUSTER
REGENERATES IT
610

NO

NO

END SECRET
CERTIFICATE
RECOVERY
608

*Fig. 7*

RETRYING: EXAMPLE OF RECREATING STUCK RESOURCES
700

*Fig. 8*

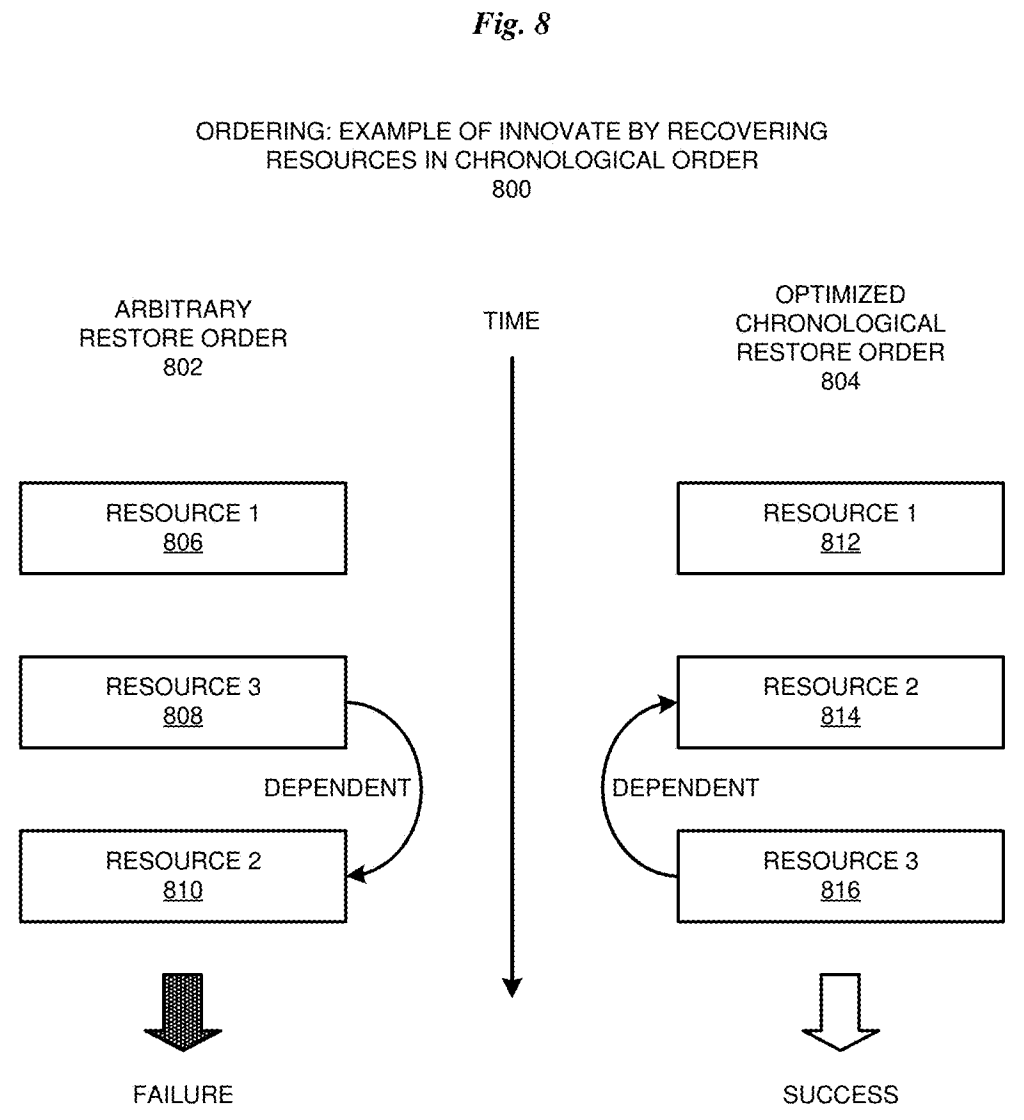

ORDERING: EXAMPLE OF INNOVATE BY RECOVERING
RESOURCES IN CHRONOLOGICAL ORDER
800

TIME

OPTIMIZED
CHRONOLOGICAL
RESTORE ORDER
804

RESOURCE 1
812

RESOURCE 2
814

RESOURCE 3
816

DEPENDENT

SUCCESS

ARBITRARY
RESTORE ORDER
802

RESOURCE 1
806

RESOURCE 3
808

RESOURCE 2
810

DEPENDENT

FAILURE

AUTOMATED RECIPE GENERATION FOR ORCHESTRATED APPLICATION RECOVERY

BACKGROUND

The present invention relates generally to container orchestration systems and container orchestrators. More particularly, the present invention relates to a method, system, and computer program designed to facilitate disaster recovery, backup/restore, and application migration services using container orchestrators.

A container orchestrator (e.g., container runtime, Kubernetes cluster) is software that automates the deployment, scaling, and management of applications, including disaster recovery, backup/restore, and application migration services. Container orchestrators are well-suited for running and managing computing workloads (e.g., applications) of various sizes and types. Container orchestrators achieve this by assembling one or more computers, whether virtual machines or bare metal, into a computer cluster that can run computing workloads within one or more containers. A computer cluster is typically a set of computers that work together as a single system, commonly used in cloud computing. Within a typical computing cluster, one or more nodes are configured to perform the same task, with operations controlled and scheduled by internal cluster software.

However, as recognized by the illustrative embodiments, transferring an application, such as a workload, from one container orchestrator to another using a snapshot of the application's resource state can be fraught with difficulties. This transferring process, which may be employed for purposes such as disaster recovery, backup/restore, or application migration, often encounters failures due to mismatches or incompatibilities between the source and target container orchestrators, as recognized by the illustrative embodiments. When these issues arise, resolving them typically requires substantial manual intervention. Administrators must painstakingly troubleshoot the transfer process to identify and implement the correct configurations or implementation solutions that would enable the application to function or operate correctly on the new container orchestrator. This troubleshooting process can be time-consuming and complex, as the troubleshooting process may require deep understanding for addressing various nuances of both the source and target systems or container orchestrators.

The challenge, as recognized by the illustrative embodiments, becomes even more evident in scenarios like large-scale disaster recovery, where there is a need to port or transfer hundreds or even thousands of critical applications to new container orchestrators. In such cases, the reliance on manual intervention becomes increasingly impractical due to the sheer volume of applications and the associated complexity of the transfer process. The scale of the task makes it difficult to efficiently and accurately handle each application individually.

Therefore, the illustrative embodiments recognize that it would be desirable to have methods, systems, and computer programs designed for transferring an application running a first container orchestrator to a new container orchestrator using the application's snapshot of the resource state from the first container orchestrator that would overcome the above disadvantages.

SUMMARY

The illustrative embodiments provide for transferring a target application to a second container orchestrator, using a snapshot of a resource state of the target application from a first container orchestrator. The embodiment includes executing the recipe, using the target application, on the second container orchestrator. The embodiment includes re-executing the recipe, using the target application, one or more times on the second container orchestrator. The embodiment includes selecting the recipe based on in response a determination that recipe meets or exceeds a threshold for operation run on the second orchestration container. The embodiment includes confirming that the selected recipe operates successfully on the second orchestration container without failure. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 3A depicts a flowchart diagram of an example a high-level algorithm flow in accordance with an illustrative embodiment;

FIG. 4 depicts a flowchart of an example of preserving owner references across clusters in accordance with an illustrative embodiment;

FIG. 5 depicts a flowchart of an example of preserving local cluster references across clusters in accordance with an illustrative embodiment;

FIG. 6 depicts a flowchart of an example of recreating certificates signed by local cluster in accordance with an illustrative embodiment;

FIG. 7 depicts a flowchart of an example of recreating stuck resources in accordance with an illustrative embodiment; and FIG. 8 depicts a block diagram of an example of innovate by recovering resources in chronological order in accordance with an illustrative embodiment;

DETAILED DESCRIPTION

Figure 1:
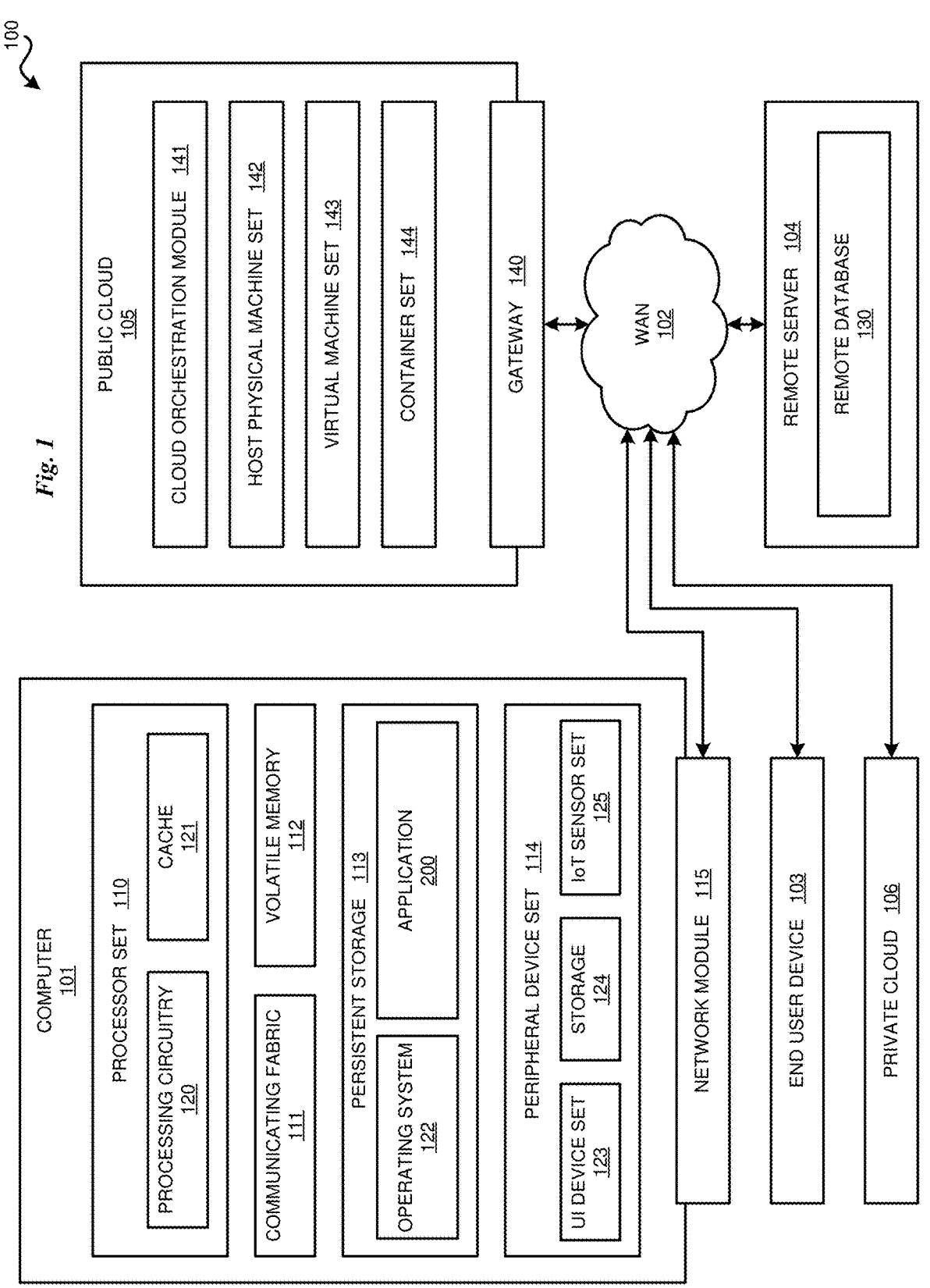
FIG. 1 depicts a block diagram of a computing environment in accordance with an illustrative embodiment.

The present disclosure addresses the deficiencies recognized by the illustrative embodiments and described above by providing a process (as well as a system, method, machine-readable medium, etc.) for transferring a target application running a first container orchestrator to a new container orchestrator, using the target application's snapshot of the resource state from the first container orchestrator. This transferring process further involves the determination of the appropriate configuration or implementation solution (i.e., recipe) of the target application's resource state on the new container orchestrator. This implementation solution determination may further include the determination of one or more recipes or recipe operations such as filtering, ordering, and patching Application Program Interface (API) resources, dependencies, or references (on the new container orchestrator) to ensure that the target application can run effectively on the new container orchestrator (e.g., recovery cluster or recovery orchestrator).

Providing improved functionality for transferring a target application running a first container orchestrator to a new container orchestrator, using the target application's snapshot of the resource state from the first container orchestrator matters for the following reasons. First, business-critical applications often involve 10 to 100 types of resources, with hundreds to thousands of individual resources. Many of these business-critical applications have implicit dependencies on each other, making it essential to manage these dependencies effectively for enterprise recovery. This requires (by a reliability engineer) handling ordering dependencies among thousands of resources within a single business-critical application. Second, the improved functionality ensures access to business-critical applications in disaster recovery, backup/restore, and application migration scenarios involving container orchestrators. Disclosed embodiments provide aforementioned advantages/benefits and technological improvements over the existing tools, techniques, and systems facilitate recipe automation recovery at an enterprise scale.

An illustrative overview of an embodiment of the invention is as follows: transferring a target application to a second container orchestrator, using a snapshot of a resource state of the target application from a first container orchestrator, generally comprises four stages: 1) Recipe Execution, 2) Recipe Re-execution, 3) Recipe Selection, and 4) Recipe Confirmation.

Recipe Execution Stage

At the one stage, an embodiment of the invention, a recipe to transfer the target application to the second orchestration container, wherein the recipe implements a solution to address a known failure class, is executed.

Recipe Re-Execution Stage

At another stage, the recipe, using the target application, one or more times on the second container orchestrator, is re-executed. In some embodiments, the second stage is integrated into the first stage, as one or more method steps.

Recipe Selection Stage

At another stage, the recipe based on a determination that the recipe meets or exceeds a threshold for operation on the second orchestration container is selected. In some embodiments, the third stage may be integrated into the first or second stage, as one or more method steps.

Recipe Confirmation Stage

At another stage, the selected recipe operates successfully on the second orchestration container without failure is confirmed. In some embodiments, the fourth stage is integrated into the first, second, or third stage, as one or more method steps.

Although the several stages described above were described in a specific order, it should be understood that other stages may be performed among the four stages or may be performed in an order other than that described, or stages may be adjusted so that they occur at slightly different times.

The following description provides examples of embodiments of the present disclosure, and variations and substitutions may be made in other embodiments. Several examples will now be provided to further clarify various aspects of the present disclosure.

Example 1: A computer-implemented method for transferring a target application to a second container orchestrator, using a snapshot of a resource state of the target application from a first container orchestrator. The method further comprises executing a recipe to transfer the target application to the second orchestration container, where the recipe implements a solution to address a known failure class. The method further comprises re-executing the recipe, using the target application, one or more times on the second container orchestrator. The method further comprises selecting the recipe based on a determination that the recipe meets or exceeds a threshold for operation on the second orchestration container. The method further comprises confirming that the selected recipe operates successfully on the second orchestration container without failure.

The above limitations are useful for streamlining and maintaining reliable application transfers between container orchestrators. By leveraging a snapshot of the resource state and executing a recipe specifically designed to address known failure classes, the method enhances the robustness of the transfer process. The iterative re-execution of the recipe on the second container orchestrator ensures that the application can be successfully deployed, while selecting recipes based on their performance against predefined thresholds guarantees optimal operation. Additionally, confirming the recipe's successful operation without failure ensures that the target application will be reliably transferred and operational, reducing the risk of deployment issues and enhancing overall system reliability. Aspects of the present disclosure not only optimizes application transfers between container orchestrators but also mitigates deployment risks and improves disaster recovery capabilities, for example.

Example 2: The limitations of Example 1, where the determination further comprises an assessment that the recipe does not meet or exceed the threshold for operation on the second orchestration container and a report detailing one or more failures associated the recipe. The above limitations advantageously enhance the robustness and reliability of assessing whether a recipe meets or exceeds the operational threshold on the second orchestration container. By evaluating whether the recipe fails to meet the operational threshold, and generating a detailed report of associated failures, the method facilitates precise troubleshooting and informed decision-making. Aspects of the present disclosure enables the improvement of the recipe or the selection of an alternative solution, ensuring that the transfer process is efficient and resilient, resulting in minimized risk of unresolved issues, and streamlined transitions between container orchestrators.

Example 3: The limitations of Example 1, where the executing a recipe further comprises of the recipe implementing at least one or more recipe operations: ordering, filtering, retrying, and correcting cluster-specific info. The above limitations advantageously enhance the flexibility and precision by specifying that the execution of the recipe includes recipe operations such as ordering, filtering, retrying, and correcting cluster-specific information. These recipe operations allow for tailored adjustments during the transfer process, accommodating the unique requirements of different clusters and orchestrators. By incorporating these recipe operations, the method effectively manages variations in configuration and operational environments, thereby reducing the likelihood of errors and improving the chances of a smooth and successful transition. Aspects of the present disclosure make the method more robust, capable of handling a broader range of scenarios and potential issues during the transfer of the target application.

Example 4: The limitations of Example 1, where the selecting the recipe based on the determination that the recipe meets or exceeds the threshold for operation on the second orchestration container further comprises of optimizing one or more steps of the recipe. The above limitations advantageously optimize one or more steps of the recipe based on its performance against the operational threshold. This optimization enhances the efficiency of the transfer process by streamlining operations, reducing execution time, and minimizing resource consumption. Performance is enhanced by fine-tuning the recipe to better align with the unique requirements of the second orchestration container, addressing inefficiencies or bottlenecks. Additionally, optimization increases adaptability to various configurations and operational environments, thereby enhancing the method's robustness and resilience. Aspects of the present disclosure enhance resource utilization during optimization resulting in cost savings and enhanced overall system performance.

Example 5: The limitations of Example 1, where executing a recipe to transfer the target application to the second orchestration container further comprises of forming a new recipe including one or more recipe operations: ordering, filtering, retrying, and correcting cluster-specific info. The above limitations advantageously enhance the flexibility and precision of the transfer process by tailoring the method to the specific requirements and constraints of the second orchestration container. Forming a new recipe with recipe operations such as ordering, filtering, retrying, and correcting cluster-specific information allows the method to effectively handle variations in configuration and operational environments, address potential issues more comprehensively, and improve overall reliability. Aspects of the present disclosure contribute to a more robust and adaptable transfer process, reducing the likelihood of errors and ensuring a smoother transition between container orchestrators.

Example 6: The limitations of Examples 5 and 1, where the determination further comprises an assessment that the recipe does not meet or exceed the threshold for operation on the second orchestration container and a report detailing one or more failures associated the recipe. The above limitations advantageously enhance the robustness and reliability of assessing whether a recipe meets or exceeds the operational threshold on the second orchestration container. By evaluating whether the recipe fails to meet the operational threshold, and generating a detailed report of associated failures, the method facilitates precise troubleshooting and informed decision-making. Aspects of the present disclosure enables the improvement of the recipe or the selection of an alternative solution, ensuring that the transfer process is efficient and resilient, resulting in minimized risk of unresolved issues, and streamlined transitions between container orchestrators.

Example 7: The limitations of Examples 6, 5, and 1, where the selecting the recipe based on the determination that the recipe meets or exceeds the threshold for operation on the second orchestration container further comprises of optimizing one or more steps of the recipe. The above limitations advantageously optimize one or more steps of the recipe based on its performance against the operational threshold. This optimization enhances the efficiency of the transfer process by streamlining operations, reducing execution time, and minimizing resource consumption. Performance is enhanced by fine-tuning the recipe to better align with the unique requirements of the second orchestration container, addressing inefficiencies or bottlenecks. Additionally, optimization increases adaptability to various configurations and operational environments, thereby enhancing the method's robustness and resilience. Aspects of the present disclosure enhance resource utilization during optimization resulting in cost savings and enhanced overall system performance.

Example 8: A computer usable program product comprising one or more computer readable storage media, and program instructions collectively stored on the one or more computer readable storage media to perform the method according to any of Examples 1-7. The computer program product of Example 8 realizes the benefits described with respect to Examples 1-7. The computer program product of Example 8 can advantageously be implemented into a variety of computer program products.

Example 9: The limitations according to Example 8, where the determination further comprises an assessment that the recipe does not meet or exceed the threshold for operation on the second orchestration container and a report detailing one or more failures associated the recipe. The above limitations realize the technical advantages discussed with respect to Example 2.

Example 10: The limitations according to Example 8, where the executing a recipe further comprises of the recipe implementing at least one or more recipe operations: ordering, filtering, retrying, and correcting cluster-specific info. The above limitations realize the technical advantages discussed with respect to Example 3.

Example 11: The limitations according to Example 8, where the selecting the recipe based on the determination that the recipe meets or exceeds the threshold for operation on the second orchestration container further comprises of optimizing one or more steps of the recipe. The above limitations realize the technical advantages discussed with respect to Example 4.

Example 12: The limitations according to Example 8, where executing a recipe to transfer the target application to the second orchestration container further comprises of forming a new recipe including one or more recipe operations: ordering, filtering, retrying, and correcting cluster-specific info. The above limitations realize the technical advantages discussed with respect to Example 5.

Example 13: The limitations according to Example 12, where the determination further comprises an assessment that the recipe does not meet or exceed the threshold for operation on the second orchestration container and a report detailing one or more failures associated the recipe. The above limitations realize the technical advantages discussed with respect to Example 6.

Example 14: The limitations according to Example 13, where the selecting the recipe based on a determination that the recipe meets or exceeds a threshold for operation on the second orchestration container further comprises of optimizing one or more steps of the recipe. The above limitations realize the technical advantages discussed with respect to Examples 6 and 7.

Example 15: A system comprising one or more processors and one or more computer-readable storage media collectively storing program instructions which, when executed by the one or more processors, are configured to cause the one or more processors to perform the method according to any of Examples 1-7. The system of Example 15 realizes the benefits described with respect to Examples 1-7. The system of Example 15 can advantageously be implemented into a variety of computing devices.

Example 16: The limitations according to Example 15, where the determination further comprises an assessment that the recipe does not meet or exceed the threshold for operation on the second orchestration container and a report detailing one or more failures associated the recipe. The above limitations realize the technical advantages discussed with respect to Example 2.

Example 17: The limitations according to Example 15, where the executing a recipe further comprises of the recipe implementing at least one or more recipe operations: ordering, filtering, retrying, and correcting cluster-specific info. The above limitations realize the technical advantages discussed with respect to Example 3.

Example 18: The limitations according to Example 15, where the selecting the recipe based on the determination that the recipe meets or exceeds the threshold for operation on the second orchestration container further comprises of optimizing one or more steps of the recipe. The above limitations realize the technical advantages discussed with respect to Example 4.

Example 19: The limitations according to Example 15, where executing a recipe to transfer the target application to the second orchestration container further comprises of forming a new recipe including one or more recipe operations: ordering, filtering, retrying, and correcting cluster-specific info. The above limitations realize the technical advantages discussed with respect to Example 5.

Example 20: The limitations according to Example 19, where the determination further comprises an assessment that the recipe does not meet or exceed the threshold for operation on the second orchestration container and a report detailing one or more failures associated the recipe. The above limitations realize the technical advantages discussed with respect to Examples 7 and 6.

Example 21: A computer-implemented method for transferring a target application to a second container orchestrator, using a snapshot of a resource state of the target application from a first container orchestrator. The method further comprises executing a plurality of recipes to transfer the target application to the second orchestration container, wherein at least one recipe in the plurality of recipes implements a solution to address at least one known failure class. The method further comprises re-executing the plurality of recipes, using the target application, one or more times on the second container orchestrator. The method further comprises selecting at least one recipe in the plurality of recipes based on a determination that the at least one recipe in the plurality of recipes meets or exceeds a threshold for operation on the second orchestration container. The method further comprises confirming that the least one selected recipe in the plurality of recipes operates successfully on the second orchestration container without failure.

The above limitations are useful for transferring applications between container orchestrators by leveraging a systematic approach involving multiple recipes. This method ensures that the target application's resource state is accurately captured and addressed by recipes designed to tackle known failure classes, thereby reducing the risk of transfer-related issues. By re-executing these recipes on the new orchestrator and selecting those that meet performance thresholds, the method increases the likelihood of successful deployment. Aspects of the present disclosure not only ensure compatibility and reliability but also provide a structured mechanism to confirm operational success of recipes, leading to a more efficient and dependable application transfer process.

Example 22: The limitations of Example 21, where the determination further comprises an assessment that none of the recipes in the plurality of recipes meets or exceeds the threshold for operation on the second orchestration container and a report detailing one or more failures associated the plurality of recipes. The above limitations advantageously enhance the robustness and reliability of assessing whether the recipes meet or exceed the operational threshold on the second orchestration container. By evaluating whether the recipes fail to meet the operational threshold, and generating a detailed report of associated failures, the method facilitates precise troubleshooting and informed decision-making. Aspects of the present disclosure enables the improvement of the recipes or the selection of an alternative solutions, ensuring that the transfer process is efficient and resilient, resulting in minimized risk of unresolved issues, and streamlined transitions between container orchestrators.

Example 23: The limitations of Example 21, where the executing a plurality of recipes to transfer the target application to the second orchestration container further comprises of at least one recipe of the plurality of recipes implementing at least one or more of a plurality of recipe operations: ordering, filtering, retrying, and filter cluster-specific info. The above limitations advantageously enhance the flexibility and precision by specifying that the execution of the recipe includes recipe operations such as ordering, filtering, retrying, and correcting cluster-specific information. These recipe operations allow for tailored adjustments during the transfer process, accommodating the unique requirements of different clusters and orchestrators. By incorporating these recipe operations, the method effectively manages variations in configuration and operational environments, thereby reducing the likelihood of errors and improving the chances of a smooth and successful transition. Aspects of the present disclosure make the method more robust, capable of handling a broader range of scenarios and potential issues during the transfer of the target application.

Example 24: The limitations of Example 21, where the selecting at least one recipe in the plurality of recipes based on the determination that the at least one recipe from the plurality of recipes meets or exceeds the threshold for operation on the second orchestration container further comprises of optimizing one or more steps of the least one selected recipe. This optimization enhances the efficiency of the transfer process by streamlining operations, reducing execution time, and minimizing resource consumption. Performance is enhanced by fine-tuning the recipe to better align with the unique requirements of the second orchestration container, addressing inefficiencies or bottlenecks. Additionally, optimization increases adaptability to various configurations and operational environments, thereby enhancing the method's robustness and resilience. Aspects of the present disclosure enhance resource utilization during optimization resulting in cost savings and enhanced overall system performance.

Example 25: A computer usable program product comprising one or more computer readable storage media, and program instructions collectively stored on the one or more computer readable storage media to perform the method according to any of Examples 21-24. The computer program product of Example 25 realizes the benefits described with respect to Examples 21-24. The computer program product of Example 25 can advantageously be implemented into a variety of computer program products.

Aspects of the present disclosure can be implemented in a variety of technical use cases. The following use cases are merely exemplary and are not intended to limit the scope of the disclosure.

In a first use case, consider a company that needs to migrate the company's complex web application from Container Orchestrator A to Container Orchestrator B. Initially, a snapshot of the target application's resource state is taken from Container Orchestrator A. This snapshot captures all current configurations and dependencies, providing a reference point for the transfer process. Next, a migration recipe specifically designed to handle known issues, such as configuration mismatches and compatibility problems, is executed to transfer the target application to Container Orchestrator B. This recipe addresses common failure scenarios and ensures that the target application is transferred with minimal disruptions. After the initial execution, the recipe is re-executed multiple times on Container Orchestrator B to refine the deployment/transfer process. This iterative approach helps to address any unforeseen issues and ensures that the target application is properly integrated and configured in the new environment. The recipe is then evaluated based on the recipe's performance on Container Orchestrator B. This evaluation involves checking whether the recipe meets or exceeds predefined operational thresholds, such as successful deployment without errors or performance degradation. Only recipes that pass this evaluation are selected for final use. Finally, the method confirms that the selected recipe operates successfully on Container Orchestrator B. This confirmation ensures that the web application is fully functional, running as expected, and free from deployment failures. This approach addresses the complications for transferring a target application to a second container orchestrator, using a snapshot of a resource state of the target application from a first container orchestrator, as exemplified in Examples 1-25 discussed above.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some computer code involved in performing the inventive methods, such as an example application 200 for transferring a target application running a first container orchestrator to a new container orchestrator, using the target application's snapshot of the resource state from the first container orchestrator. The following are definitions for terms used throughout the disclosure. "Container Orchestrator" is a term used in the present disclosure to describe as software or computer code that automates the deployment, scaling, and management of applications, including disaster recovery, backup/restore, and application migration services; the term "container orchestrator" may be used interchangeably with the terms "orchestrator," "cluster," "container runtime" or "Kubernetes cluster" in the present disclosure; "resource state" is a term used in the present disclosure to describe a component or entity within a system or container orchestrator that is subject to backup and restoration processes; a "resource state" can also describe an object, data at a specific moment of time, a dependency, a library, a concrete instance of a concept on a container orchestrator, or a RESTful (Representational State Transfer) programmatic interface provided via HTTP (Hypertext Transfer Protocol); a "resource state" may possess or have specific attributes, such as a creation timestamp, ownership relationship, label status (whether labelled or not), which determine the resource's order in the restoration sequence; "resource states" may vary in type, such as pods (e.g., smallest deployable units that be created, scheduled, managed), secrets (e.g., objects to store sensitive data such as passwords), or other entities, and are grouped together within resource groups; the term "resource state" may be used interchangeably with the term "resource"; "recipe" is a term used in the present disclosure to describe the determination of the appropriate or optimal configuration or implementation solution for a resource state of target application on the new container orchestrator; the term "recipe" may be used interchangeably with terms "implementation solution" or "appropriate configuration" or "solution"; "recipe operation" is a term used in the present disclosure to describe a method for implementing a recipe or recipe strategy, such as ordering, filtering, retrying, correcting cluster-specific information; the term "recipe operation" may be used interchangeably with terms "recipe strategy"; "snapshot" is a term used in the present disclosure to describe obtaining or receiving a copy of data at a specific moment of time; the term "resource group" is used in the present disclosure to describe a collection or set of related resources that may be managed and restored together during a recovery process for a container orchestrator; a "resource group" may be organized based on a criteria such as their creation timestamps, resource types, ownership relationships, or label status for the purpose of maintaining dependencies (e.g., libraries) and consistencies within container orchestrators or ensuring that the restoration process follows a specific order, such as chronological order or owner-to-ownee order; the term "failure" is used in the present disclosure to describe a recognized or discovered pattern or issue that commonly occur during processes of transferring or managing applications in container orchestrators; "failures" may be addressed through specific implementation solutions or strategies implemented in the recipes for transferring applications; the term "known failure class" is used in the present disclosure to describe a category or type of failure that has been previously identified and documented within the context of testing, validating, migrating, transferring or managing applications in container orchestrators; the purpose of addressing a "known failure class" is to mitigate or resolve predictable issues during the transfer or migration of the target application to a new container orchestrator; the term "threshold" is a used in the present disclosure to describe a predefined criterion, standard, or benchmark that a recipe must meet or exceed to be considered suitable for successful operation on the second container orchestrator; a "threshold" may serve as a standard or benchmark for evaluating the effectiveness of the recipe in transferring and running the target application without failure, ensuring that only those recipes that meet or surpass this standard or benchmark are selected for execution; for example, a performance "threshold" might require that the recipe enables the target application to achieve a minimum response time of 100 milliseconds under a specific load; similarly, an error rate "threshold" may mandate that the target application operates with an error rate below 0.1%, ensuring reliability during execution or operation; Other examples of "thresholds" include a resource utilization "threshold," where the recipe must maintain CPU or memory usage below a certain level, such as 70% during peak condition; a deployment time "threshold" may require that the target application is successfully deployed within a set timeframe, such as 10 minutes, to ensure efficiency. Additionally, a compatibility "threshold" may require that all dependencies and configurations are correctly resolved, allowing the target application to run without modification on the second container orchestrator; another example, a scalability "threshold" may ensure that the recipe enables the target application to scale up to a certain number of instances, like supporting 1,000 concurrent users, with minimal performance degradation; the term "optimizing" or "optimize" used in the present disclosure describe a process of enhancing or improving the performance or efficiency, in terms of space, usage, and time, of a recipe to ensure the recipe meets or exceeds threshold for operation on the second container orchestrator; "optimizing" may include: streamlining steps or recipe operations in the recipe to reduce resource usage or execution time, thereby making the recipe more effective; minimizing errors by modifying the recipe to lower the likelihood of errors or failures during target application execution; adjusting the recipe to better align with the specific requirements or configurations of the second container orchestrator or adjusting the recipe to ensure the recipe consistently performs as expected and reliably addresses the known failure class; refining procedures or steps by revising recipe operations within the recipe, such as ordering, filtering, retrying, or correcting cluster-specific information, thereby improving overall performance of the recipe; or fine-tuning the recipe to achieve the best possible results in transferring and operating the target application on the second container orchestrator;

In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer

101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
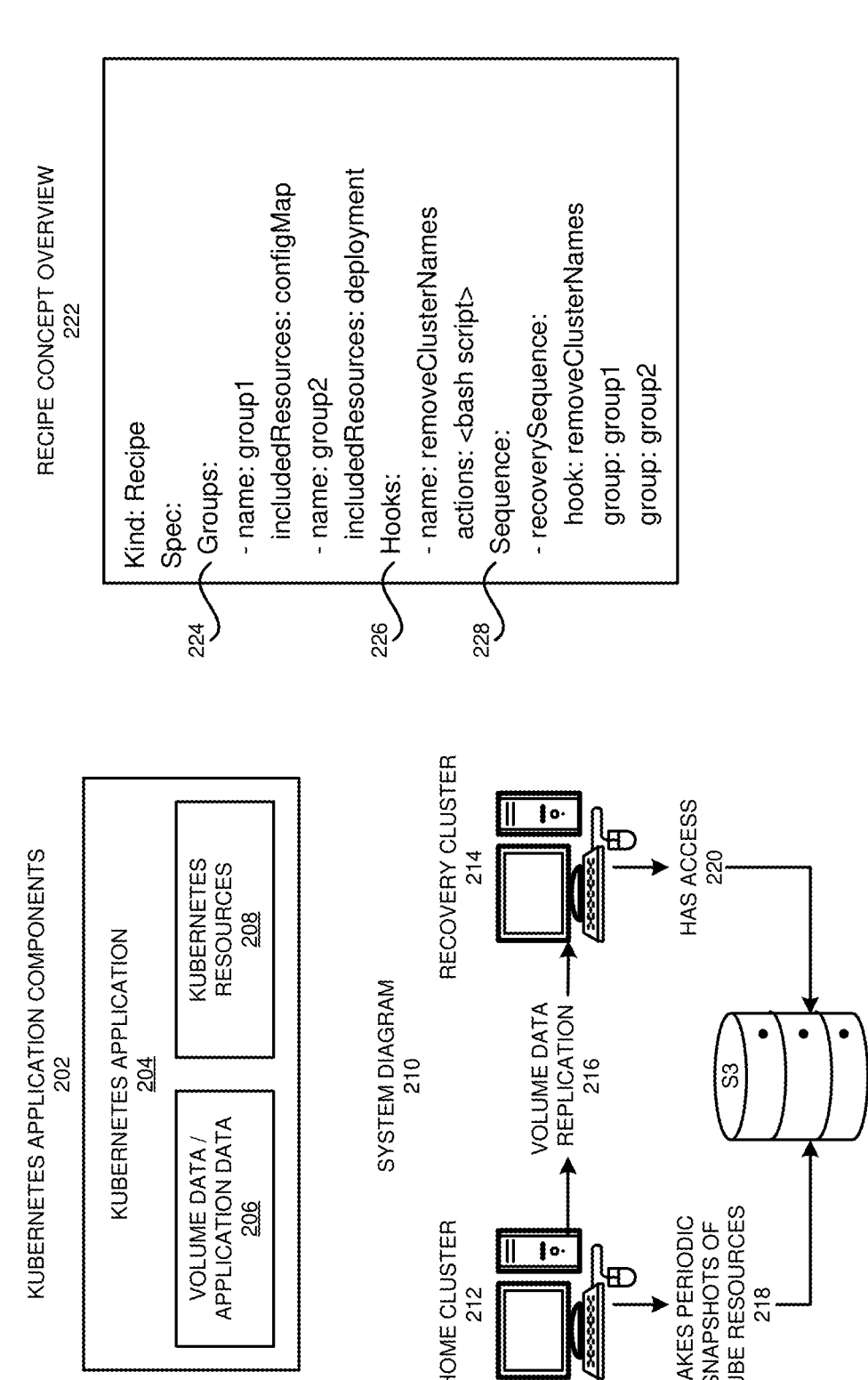
FIG. 2 depicts a block diagram of an example system diagram and recipe in accordance with an illustrative embodiment.

With reference to FIG. 2, this figure depicts block diagram 201 for system diagram and recipe in accordance with an illustrative embodiment. In the illustrated embodiment, system diagram and recipe 201 includes a Kubernetes application components 202, system diagram 201, and Recipe concept 222. Kubernetes application components 202 shows a container orchestrator from a software perspective and includes the following components: Kubernetes application 204, volume data/application data 206, and Kubernetes resources 208 (e.g., resource states). System diagram 210 shows the transfer (e.g., migration) of resource states (e.g., data) between two container orchestrators from a hardware perspective. System diagram 210 includes home cluster 212 (e.g., first container orchestrator), recovery cluster 214 (e.g., second container orchestrator), and data volume S3. Home cluster 212 handles volume data replication 216, transferring data to recovery cluster 214. Additionally, home cluster 212 (e.g., first orchestrator container) takes periodic snapshots 218 of Kubernetes resources 208, storing the resource states. Recovery cluster 214 (e.g., second orchestrator container) has access 220 to the data volume S3 and uses the data within data volume S3 to recover the target application executing on home cluster 212 if recovery cluster 214 is activated. Recipe concept overview 222 represents the strategies or techniques, including their timing considerations, referred to as "recipes," that are available or created to troubleshoot or resolve issues that may arise during the transfer (e.g., migration) of resource states (e.g., data) between two container orchestrators (e.g., when activating the recovery cluster 214 in a disaster recovery scenario). Recipe concept overview 222 includes kind: recipe, spec, groups 224, hooks 226, and sequence 228. Groups 224 includes name: group 1, included resource:configMap, name:group2, includedresource: deployment. Hooks 226 includes name: for example, remove clustername, actions: <bash script>. Sequence 228 includes recoverysequence: hook: removeClustername, group: group1, group: group 2. The components and details (e.g., a pre-defined or discovered recipes based on a known failure classes) of the recipe concept overview 222 will be explained in greater depth later. Although three modules described above were described in a specific order, it should be understood that other modules may be performed among the three modules or may be performed in an order other than that described, or modules may be adjusted so that they occur at slightly different times.

With reference to FIG. 3A, this figure depicts a flowchart diagram of high-level algorithm, recipe execution and testing, recipe strategies, and sample recipes of an embodiment according to flowchart diagram 300. The modules—method of recipe execution and testing 312, new recipe strategies 316, and sample recipes 318—serve as key elements within the steps of high-level algorithm flow 302. In the illustrated embodiment, high-level algorithm flow 302 generally follows these steps: step 304 initiates the high-level algorithm flow 302 by constructing or forming a new recipe. At step 306, the new recipe is applied to a recovery cluster (e.g., recovery cluster 214, second container orchestrator) and an attempt to recover the resource states of a home cluster (e.g., home cluster 212, first container orchestrator). Next, step 308 performs a test to verify the success of the recovery by determining whether the recipe meets or exceeds a threshold for operation on the recovery cluster. If the test result is positive/yes, proceed to step 310 for optimizing one or more individual steps or operations of the recipe. Otherwise, high-level algorithm flow 302 moves to step 304 to develop a new recipe for troubleshooting or resolving issues related to recovering the resource states of a target application on the home cluster. Methods of recipe execution and testing 312 represent the timing or scheduling considerations associated with testing or executing one or more recipes and may be applied at various steps within high-level algorithm flow 302. As shown, under methods of recipe execution and testing 312, one or more recipes can be executed in parallel 342 (e.g., concurrently/simultaneously), serially 344 (e.g., sequentially or in a time-ordered manner), or using a hybrid 346 approach (e.g., a combination of concurrent and sequential execution). For instance, in the "Parallel" method, recipes 1 through 3 are executed or tested concurrently, referred to as the "parallel method" 343; in the "Serial" method, recipes 1 through 3 are executed sequentially in a time-ordered manner or a specified time, referred to as the "Serial method" 344; and in "Hybrid" method 346, some recipes are executed in parallel while others are executed in series. For example, recipes 1 and 2 are executed or tested in parallel, followed by the execution of recipe 3 after recipes 1 and 2 are completed.

Still referring to FIG. 3A, new recipe strategies (or operations) 316 represent the creation, formation, or experimentation associated with composing one or more new recipes and may be applied at step 304 within high-level algorithm flow 302. New recipe strategies (or operations) 316 may include one or more of the following approaches, strategies or techniques that are available or created to troubleshoot or resolve issues that may arise during resource state transfer: resource ordering 332, resource filtering 334, resource retrying 336, and resource correcting for cluster-specific information 338. Resource ordering 332 determines the sequence in which one or more resource groups are restored. Resource filtering 334 can be applied to exclude or remove unrelated or specific cluster information. Resource retrying 336 is an active strategy designed to address the failure of resource restoration. Resource correcting of cluster-specific information 338 is an active strategy aimed at correcting cluster-specific data.

Still referring to FIG. 3A, sample recipes 318 include complete recipes in which timing and composing strategies have been applied (e.g., a pre-defined or discovered recipes based on a known failure classes). These sample recipes 318 can be utilized at various steps within the high-level algorithm flow 302, particularly in steps 306, 380, and 310. For example, Recipe 1 (348) is configured with Group 1, where all resources or resource states are ordered arbitrarily. Recipe 2 (352) is configured with Group 1, where all resources are ordered chronologically. Recipe 3 (350) is configured with Group 1, where unowned resources are ordered chronologically. Recipe 4 (354) includes a hook, fixed cluster names, and Group 1, with all resources ordered chronologically.

Figure 3B:
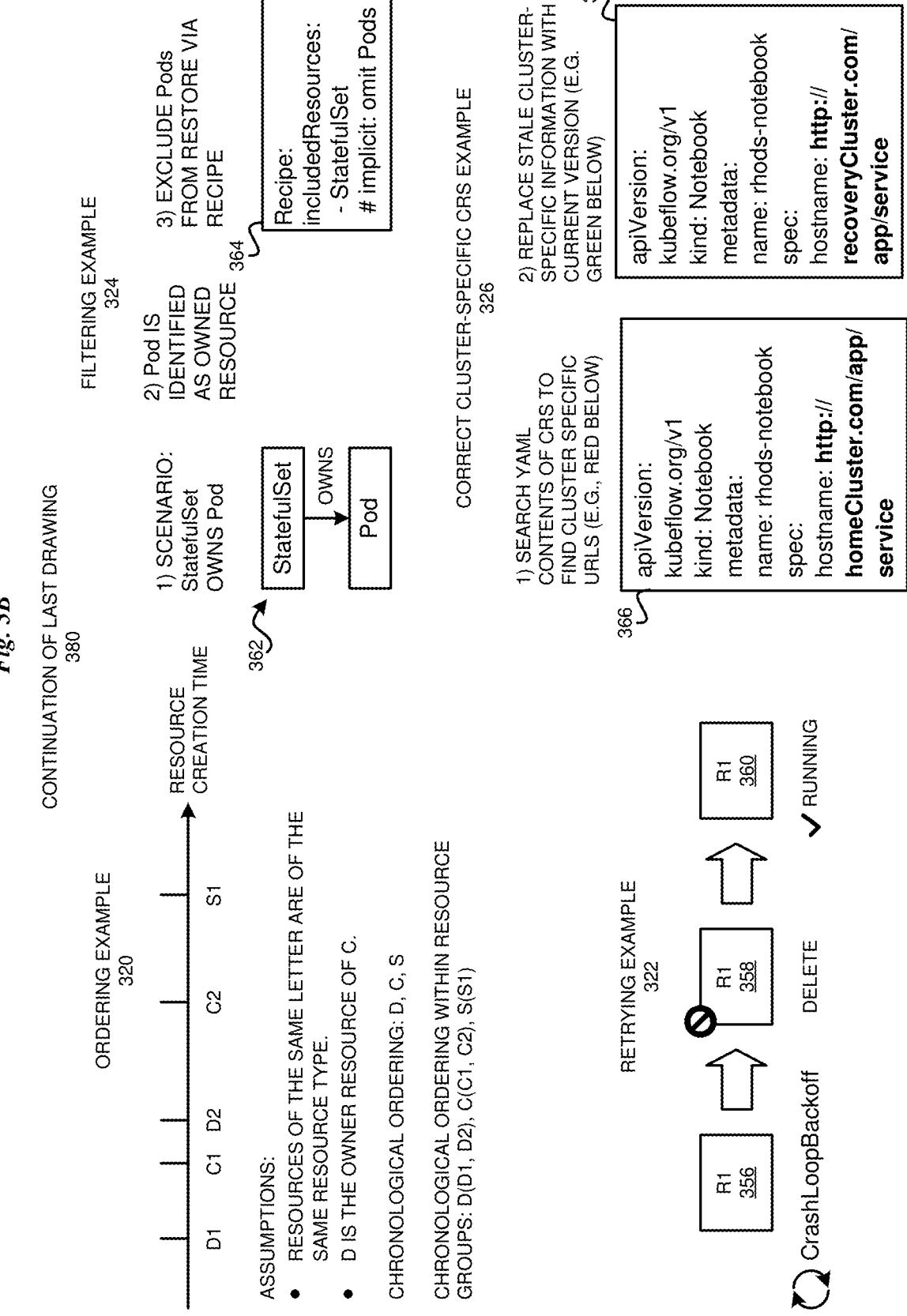
FIG. 3B depicts a block diagram of an example involves trying several recipes in accordance with an illustrative embodiment.

With reference to FIG. 3B, this figure depicts a block diagram depicting examples of four recipe strategies according to embodiment 380. The illustrated embodiment includes examples of different approaches: resource ordering example 320 (e.g., ordering 332), filtering example 324 (e.g., filtering 334), retrying example 322 (e.g., retry 336), and correcting cluster-specific CR example 326 (e.g. correcting cluster-specific info 338); the ordering example 320 demonstrates the sequence in which recipes are applied. The filtering example 324 shows how recipes are filtered based on specific criteria; retrying example 322 illustrates the process of retrying recipes to achieve desired results; and correcting cluster-specific CR 326 example shows how recipes are tailored or corrected for specific clusters. Additionally, those skilled in the art will appreciate that while the phrase "retrying recipes" in retrying example 322 may be interpreted as "retrying entire recipes," in some embodiments, only a portion of specific recipe is retried. For example, this could involve retrying a specific aspect of the recipe, such as a resource (e.g., pod) at the resource level, rather than the entire recipe.

Resource ordering example 320 determines the sequence in which one or more resource groups are restored, ensuring that each resource group is fully restored before the next resource group begins. There are three primary methods of ordering: 1. chronological ordering: restore resource groups based on the creation timestamp of the first backed-up resource within each group; 2. chronological ordering within resource groups: group resources by type (e.g., pods, secrets) and then restore each resource group in chronological order; and 3. owner-to-ownee ordering: restore owner resources first, followed by their dependent (ownee) resources. In the upper left corner of FIG. 3B, resource ordering example 320 shows a timeline annotated resource creation time, with time progressing from left to right. It will be appreciated that resource groups "D," "C," and "S" are arranged in chronological order. In this example, resources with the same letter denote the same resource type and belong to the same resource group (e.g., D1 and D1 belong to resource group "D"), while number indicates the specific instance of each resource. Additionally, chronological ordering is maintained within each resource group, with "D" (D1, D2), "C" (C1, C2), and "S" (S) listed sequentially. Although three primary methods of ordering have been described, it should be understood that other ordering methods may also be considered.

Still referring to FIG. 3B, resource filtering or filtering can be applied using various strategies or approaches: 1. cluster-independent only filtering: identify (or detect) and remove cluster-specific information (e.g., information related to a specific container orchestrator). For example, this might involve removing a field in a custom resource (CR) that contains the name of the home cluster (e.g., first container orchestrator); 2. unowned-only filtering: recover only resources that lack an "ownerReference." For example, if a custom resource (CR) owns a "secret" (e.g., a resource state), only the customer resource (CR) is recovered, while "secret" is omitted or removed; and 3. Exclusion of irrelevant resources: exclude or do not recover resources that are not related to transfer or recovery of a target application executing on the home cluster. Examples of irrelevant resources (e.g. libraries) that may be excluded include events, nodes, backup.velero.io, restore.velero.io, and resticrepositories.velero.io. Additionally, resource filtering may be generally applied in various forms, such as filtering all objects of a single type, individual objects, or specific parts/fields of objects (e.g., particular fields in a custom resource). In the upper right corner of FIG. 3B, resource filtering example 324 illustrates an instance of the previously mentioned filtering approaches. Resource filtering example 324 depicts a three-part filtering scenario: 1) "StatefulSet" owns "Pod" 362; 2) "Pod" is identified as an owned resource, and 3) "Pod" is excluded from the restore/recovery using a specified recipe 364.

Referring again to FIG. 3B, a resource retrying (e.g., retrying) is an active strategy/approach designed to address the failure of resource restoration (e.g., resource transfer) by deleting and recreating the failed resource. A resource retrying strategy/approach may involve scanning all resources, identifying those that failed to restore, and then deleting and recreating the failed restores. In some embodiments, either the entire recipe may be retried or a portion (e.g., a pod resource) of the recipe may be retired. In the bottom left corner of FIG. 3B, retrying example 322 illustrates an instance of a retrying approach. For example, a home cluster (e.g. first container orchestrator) has a resource (e.g., restore state, or custom resource) "R1" 356 with field value "CrashLoopBackoff," represented by a first rectangle labelled with "R1" An attempt to restore or transfer resource "R1" 358 to a recovery cluster (e.g., second container orchestrator) fails, represented by a second rectangle labelled with "R1" and annotated with slashed circle. The resource "R1" is then deleted, as shown. Finally, another attempt is made to restore or transfer resource "R1" 360 to the recovery cluster, which is successful, represented by a third rectangle labelled with "R1" and annotated with a checkmark and the label "running."

Referring again to FIG. 3B, resource correcting of cluster-specific information (e.g., correcting of cluster-specific information) is an active strategy aimed at correcting cluster-specific data, rather than merely deleting the cluster-specific data and relying on an application controller of a recovery cluster (e.g., second container orchestrator) to regenerate the correct field (e.g., metadata or value) for the cluster-specific data. For instance, UIDs (universal identifiers) are considered cluster-specific information. When a specific target application is transferred or recovered, the UIDs associated with the target application would be outdated (e.g. stale) or incorrect if those UIDs are restored verbatim in a different recovery/transfer cluster. The general steps involved in this active strategy to correcting cluster-specific information are as follows: 1. owner reference verification: determine whether the owner, as indicated in the "ownerReference" field, exists in the recovery/transfer cluster (e.g., second container orchestrator). If the owner exists, update the UID on the owned resource to reflect the UID of the owner in the new cluster (e.g., second container orchestrator). The owned resource should remain associated with the owner in the recovery/transfer cluster. If the owner does not exist, the resource becomes orphaned and should be released through garbage collection. The UID field will be set to an invalid value; and 2. Cluster identifier correction (e.g., considering whether the cluster identifiers exist as resources): a) retrieve (e.g., obtain or get) all resources used in the target application; b) export (e.g., dump) the resources in YAML format (i.e., YAML is a human-readable data serialization language), c) search through the YAML contents for cluster name using an regular expression engine, particularly in the "http://[regex_home_cluster_URL]", D) replace these instances "http://[regex recovery cluster URL] ." In the bottom right corner of FIG. 3B, correcting cluster-specific CRS example 326 visually illustrates an instance of a resource correcting of cluster-specific information approach: 1) search YAML contents of CRS to find cluster specific (e.g., container orchestrator) URLs. Rectangle 366 represents a located cluster-specific URL (e.g., hostname: http://homecluster.com/app/service) after searching the YAML contents; and 2) replace stale cluster-specific information with current version (e.g., recovery cluster or second container orchestrator). Rectangle 368 represents the replacement of stale cluster-specific information (e.g., hostname: http://recoverycluster.com/app/service) after executing correcting cluster-specific CRs example 326.

With reference to FIG. 4, this figure depicts a flowchart 400 depicting the process of correcting cluster-specific information, specifically providing an example of preserving owner references across clusters according to an illustrative embodiment. It should be noted that the flowchart for correcting cluster-specific information by preserving owner references across clusters 400 can be considered an example of the correcting cluster-specific info 338 mentioned earlier. In this embodiment, a goal is to preserve owner references (e.g., resources) across both the source cluster (e.g., the first container orchestrator or home cluster) and the recovery cluster (e.g., the second container orchestrator). Preserving owner references is particularly useful when the owner reference is deleted (i.e., collected by the garbage collector), but the owned object remains uncollected. To facilitate garbage collection (e.g., cleanup) by the system (e.g., computer 101), an invalid UID (e.g., unique identifier) is used.

Step 402 initiates resource (i.e., owner references) recovery process per the illustrated embodiment for process of 400. In step 404, a check is performed to determine whether the owner with a specific name and UID (e.g., unique identifier) exists in the snapshot of the source cluster (e.g., first container orchestrator, home cluster). If the owner with the specified name and UID (e.g., unique identifier) is found ("yes") in the source cluster's snapshot, the process moves to step 406. If not found, the process proceeds to step 408.

In step 406, a check is conducted to determine whether the owner with the specified name exists in the recovery cluster (e.g., second container orchestrator). The snapshot of the recovery cluster (e.g., second container orchestrator) is reviewed to restore the owner first by omitting the UID (e.g., unique identifier) and retaining the specified name, allowing the system (e.g., computer 101) to populate the correct name at the creation time of the recovery cluster (e.g., second container orchestrator). If the owner with the name is found in the recovery cluster (e.g., second container orchestrator), the process advances to step 410. If not (e.g., no), the process moves to step 412.

In step 408, the owner reference UID (e.g., unique identifier) is set to an invalid value, enabling the system (e.g., computer 101) to perform garbage collection on the owner reference.

In step 410, an owned object is created by specifying the owner by name and omitting the UID, which allows the system (e.g., computer 101) to automatically populate the owner reference. Then, the process advances to step 412.

In step 412, the owner resource (e.g., owner reference) originally from the snapshot of source cluster (e.g., first container orchestrator, home cluster) is created in the in the recovery cluster (e.g., second container orchestrator), thereby preserving the owner resource within the recovery cluster (e.g., second container orchestrator).

With reference to FIG. 5, this figure depicts a flowchart 500 depicting the process of correcting cluster-specific information, specifically an example of preserving local cluster references across clusters according to an illustrative embodiment. It should be noted that the flowchart for correcting cluster-specific information by preserving local cluster references across clusters 500 can be considered an example of the correcting cluster-specific info 338 mentioned earlier. In this embodiment, a goal is to preserve local cluster references (e.g., resources) across both the source cluster (e.g., the first container orchestrator or home cluster) and the recovery cluster (e.g., the second container orchestrator). Preserving local cluster references is particularly useful when determining the old name of the source cluster (e.g., the first container orchestrator or home cluster) using the source cluster's snapshot. To determine the old cluster name, tokenization is employed to identify candidates for the old cluster name. Step 502 initiates resource recovery process per the illustrated embodiment for process of 500. In step 504, a check is performed to determine whether the name of the source cluster (e.g., the first container orchestrator or home cluster) appears in the resource fields as a token. If the name of the source cluster (e.g., the first container orchestrator or home cluster) is found ("yes") in the resource fields as a token, the process moves to step 506. If not ("no"), the process proceeds to step 508.

In step 506, instances of the name of the source cluster (e.g., the first container orchestrator or home cluster) are replaced with the name of the recovery cluster (e.g., the second container orchestrator). Then, the process moves to step 508.

In step 508, the process concludes with the resource cluster name adjustment.

With reference to FIG. 6, this figure depicts a flowchart 600 depicting the process of correcting cluster-specific information, specifically an example of recreating certificates signed by the local cluster according to an illustrative embodiment. It should be noted that correcting cluster-specific information by recreating certificates (e.g., resources or secrets) signed by local cluster 600 can be considered an example of the correcting cluster-specific info 338 mentioned earlier. In this embodiment, a goal is to recreate certificates (e.g., resources or secrets) signed by a local cluster (e.g., the first container orchestrator or home cluster) in the recovery cluster (e.g., the second container orchestrator). Identifying and recreating certificates (e.g., resources or secrets) signed by the local cluster (e.g., the first container orchestrator or home cluster) is useful for maintaining resource consistency across both the local cluster (e.g., the first container orchestrator or home cluster) and the recovery cluster (e.g., the second container orchestrator). For example, self-signed certificates (e.g., resources or secrets) are often used to authenticate intra-application communication (e.g., TCP/IP or sockets or Transport Layer Security), but in a disaster scenario, the local cluster (e.g., the first container orchestrator or home cluster) that issued self-signed certificates (e.g., resources or secrets) may be unavailable for validation of the recovery cluster (e.g., the second container orchestrator). To address this, this embodiment proposes recreating these certificates with the certificate and signature of the recovery cluster (e.g., the second container orchestrator). To identify certificates (e.g., resources or secrets) signed by the local cluster (e.g., the first container orchestrator or home cluster) for regeneration, one or more recipe filtering operations may be applied. Step 602 initiates resource recovery process per the illustrated embodiment for process of 600. In step 604, a check is performed to determine whether the secret (e.g., resource) likely contains a TLS (Transport Layer Security) certificate (e.g., certificate) based on field names. If the secret is likely to contain a TLS certificate (i.e., "yes"), the process moves to step 606. Otherwise, the process proceeds to step 608.

In step 606, if the TLS certificate (e.g., certificate) is signed by the local cluster (e.g., the first container orchestrator or home cluster), the process advances to step 610. Otherwise, the process moves to step 608.

In step 608, the process concludes, ending the secret certificate recovery.

In step 610, the TLS certificate (e.g., certificate) is filtered to allow the recovery cluster (e.g., the second container orchestrator) to regenerate the TLS certificate (e.g., certificate).

Figure 7:
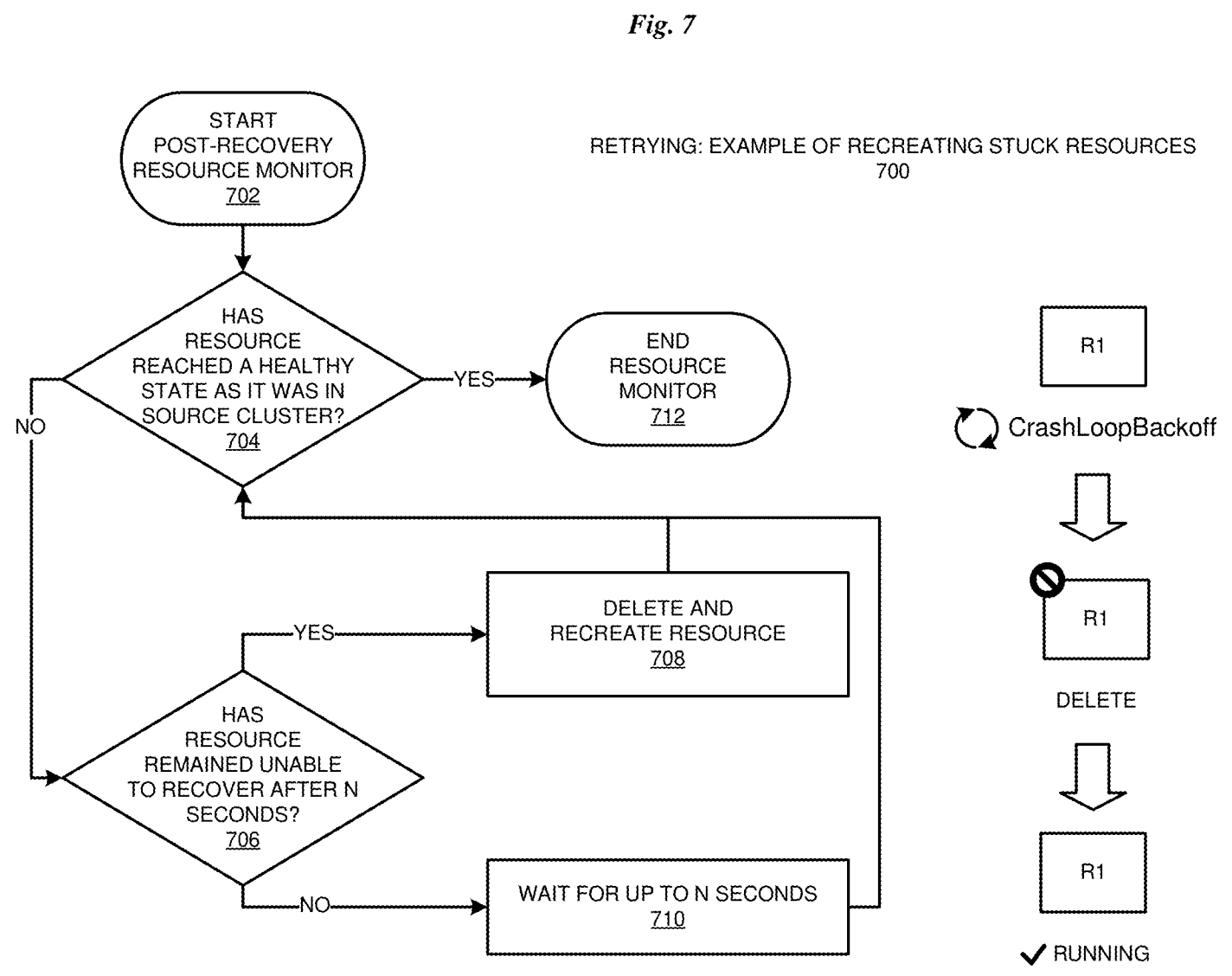

With reference to FIG. 7, this figure depicts a flowchart 700 depicting the process of retrying, specifically an example of recreating stuck resources according to an illustrative embodiment. It should be noted that the flowchart for recreating stuck resources 700 can be considered an example of the retry 336 mentioned earlier. This embodiment acknowledges that stuck resources with unresolved dependencies may cause delays in deletion and recreation of stuck resources. Since resources often depend on other resources, recreating failed or stuck resources ensures that dependencies of failed or stuck resources are created first by the system (e.g., computer 101). Furthermore, an objective in this embodiment is to recreate stuck or failed resources within the recovery cluster (e.g., the second container orchestrator) using the source cluster (e.g., the first container orchestrator or home cluster) as a model. The source cluster (e.g., the first container orchestrator or home cluster) is used for comparison because it is in a healthy state.

Step 702 initiates resource recovery process per the illustrated embodiment for process of 700. In step 704, a check is performed to determine whether the resource (e.g., "R1") has reached a healthy state as the resource was in the source cluster (e.g., the first container orchestrator or home cluster). If the resource has reached a healthy state (i.e., "yes"), the process moves to step 712. Otherwise, the process proceeds to step 706.

In step 706, if the resource has not recovered after n seconds, the process moves to step 708. Otherwise, it moves to step 710. At step 708, the resources are deleted and recreated, and the process then returns to step 704.

In step 710, the process waits for up to n seconds before proceeding to step 704.

In step 712, the resource monitoring process ends.

On the right-hand side of FIG. 7, "R1" (a resource) is shown as being stuck in a "crashloopbackoff" state. Following the process outlined in flowchart 700, "R1" is deleted and recreated, and "R!" should now be running correctly, as depicted at the bottom of the right-hand side of FIG. 7.

With reference to FIG. 8, this figure depicts a block diagram 800 depicting the process of ordering, specifically an example of innovate by recovering resources in chronological order according to an illustrative embodiment. It should be noted that the block diagram for ordering and innovate by recovering resources in chronological order 800 can be considered an example of the correcting cluster-specific info 332 mentioned earlier. In this embodiment, a goal is to capture the chronological sequence (e.g., time-ordered sequence) of resource creation steps during the successful deployment of a target application. For instance, a disaster recovery recipe may be generated based on this chronological sequence. Additionally, this embodiment identifies and considers the dependencies between resources and resource types during the creation phase of a successful deployment. Generally, the process in the illustrated embodiment may involve: 1) restoring each instance of a resource in the order of that resource's creation; 2) Optimization 1: discovering dependencies (e.g., libraries) between resource types using resource owner information and restoring each resource according to that resource's creation time and dependencies; 3) Optimization 2: when a resource type is created without interleaving with other resource types, restoring the entire resource type at once or at one time; and 4) validating the recipe for successful failover and failback for a resource or resources. In other embodiments, the chronological ordering or ordering for a particular resource type may be relaxed if all instances of that resource type can be restored simultaneously.

In the illustrative embodiment, the diagram shows two scenarios on a vertical timeline: an arbitrary restore order 802 and an optimized chronological restore order 804. The arbitrary restore order 802 includes Resource 1 (806), Resource 3 (808), and Resource 2 (810). Resource 3 (808) depends on Resource 2 (810), as indicated by a circular arrow from Resource 3 (808) to Resource 2 (810). This chronological sequence (e.g., time-ordered sequence) results in a failure at the end of the arbitrary restore process due to the improper ordering.

Conversely, the optimized chronological restore order 804 progresses from top to bottom in time, where Resource 1 (812), Resource 2 (814), and Resource 3 (816) are restored in sequence. A circular arrow from Resource 2 (814) to Resource 3 (816) indicates the discovered dependency. This optimized chronological sequence (e.g., time-ordered sequence) results in a successful outcome, with Resource 3 (816) correctly restored after Resource 2 (814).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method for transferring a target application to a second container orchestrator, using a snapshot of a resource state of the target application from a first container orchestrator, the computer-implemented method comprising:

executing a recipe to transfer the target application to the second container orchestrator, wherein the recipe includes an instruction to cause a change at the second container orchestrator relative to a resource involved in the transfer, the change comprising at least one of (i) changing a sequence in which the resource is restored, (ii) excluding an unrelated cluster information from a specification of the resource, (iii) changing a timing of restoration of the resource, and (iv) correcting a stale cluster information in the specification of the resource;

re-executing the recipe, using the target application, one or more times on the second container orchestrator;

selecting the recipe based on a determination that the recipe meets or exceeds a threshold for operation on the second container orchestrator; and confirming that the selected recipe operates successfully on the second container orchestrator without failure.

2. The method of claim 1, wherein: the determination further comprises an assessment that the recipe does not meet or exceed the threshold for operation on the second container orchestrator and a report detailing one or more failures associated the recipe.

3. The method of claim 1, wherein: the selecting the recipe based on the determination that the recipe meets or exceeds the threshold for operation on the second container orchestrator further comprises optimizing one or more steps of the recipe.

4. The method of claim 1, wherein: executing a recipe to transfer the target application to the second container orchestrator further comprises forming a new recipe including one or more recipe operations: ordering, filtering, retrying, and correcting cluster-specific info.

5. The method of claim 4, wherein: the determination further comprises an assessment that the recipe does not meet or exceed the threshold for operation on the second container orchestrator and a report detailing one or more failures associated the recipe.

6. The method of claim 5, wherein: the selecting the recipe based on a determination that the recipe meets or exceeds a threshold for operation on the second container orchestrator further comprises optimizing one or more steps of the recipe.

7. A computer usable program product comprising one or more computer readable storage media, and program instructions collectively stored on the one or more computer readable storage media, the program instructions executable by a processor to cause the processor to perform operations transferring a target application to a second container orchestrator using a snapshot of a resource state of the target application from a first container orchestrator comprising:

executing a recipe to transfer the target application to the second container orchestrator, wherein the recipe includes an instruction to cause a change at the second container orchestrator relative to a resource involved in the transfer, the change comprising at least one of (i) changing a sequence in which the resource is restored, (ii) excluding an unrelated cluster information from a specification of the resource, (iii) changing a timing of restoration of the resource, and (iv) correcting a stale cluster information in the specification of the resource;

re-executing the recipe, using the target application, one or more times on the second container orchestrator;

selecting the recipe based on a determination that the recipe meets or exceeds a threshold for operation on the second container orchestrator; and confirming that the selected recipe operates successfully on the second container orchestrator without failure.

8. The computer usable program product of claim 7, wherein: the determination further comprises an assessment that the recipe does not meet or exceed the threshold for operation on the second container orchestrator and a report detailing one or more failures associated the recipe.

9. The computer usable program product of claim 7, wherein: the selecting the recipe based on the determination that the recipe meets or exceeds the threshold for operation on the second container orchestrator further comprises optimizing one or more steps of the recipe.

10. The computer usable program product of claim 7, wherein: executing a recipe to transfer the target application to the second container orchestrator further comprises forming a new recipe including one or more recipe operations: ordering, filtering, retrying, and correcting cluster-specific info.

11. The computer usable program product of claim 10, wherein: the determination further comprises an assessment that the recipe does not meet or exceed the threshold for operation on the second container orchestrator and a report detailing one or more failures associated the recipe.

12. The computer usable program product of claim 11, wherein: the selecting the recipe based on a determination that the recipe meets or exceeds a threshold for operation on the second container orchestrator further comprises optimizing one or more steps of the recipe.

13. A computer system comprising a processor and one or more computer readable storage media, and program instructions collectively stored on the one or more computer readable storage media, the program instructions executable by the processor to cause the processor to perform operations transferring a target application to a second container orchestrator, using a snapshot of a resource state of the target application from a first container orchestrator comprising:

executing a recipe to transfer the target application to the second container orchestrator, wherein the recipe includes an instruction to cause a change at the second container orchestrator relative to a resource involved in the transfer, the change comprising at least one of (i) changing a sequence in which the resource is restored, (ii) excluding an unrelated cluster information from a specification of the resource, (iii) changing a timing of restoration of the resource, and (iv) correcting a stale cluster information in the specification of the resource;

re-executing the recipe, using the target application, one or more times on the second container orchestrator;

selecting the recipe based on a determination that the recipe meets or exceeds a threshold for operation on the second container orchestrator; and confirming that the selected recipe operates successfully on the second container orchestrator without failure.

14. The computer system of claim 13, wherein: the determination further comprises an assessment that the recipe does not meet or exceed the threshold for operation on the second container orchestrator and a report detailing one or more failures associated the recipe.

15. The computer system of claim 13, wherein: the selecting the recipe based on the determination that the recipe meets or exceeds the threshold for operation on the second container orchestrator further comprises optimizing one or more steps of the recipe.

16. The computer system of claim 13, wherein: executing a recipe to transfer the target application second container orchestrator further comprises forming a new recipe including one or more recipe operations: ordering, filtering, retrying, and correcting cluster-specific info.

17. The computer system of claim 16, wherein: the determination further comprises an assessment that the recipe does not meet or exceed the threshold for operation on the second container orchestrator and a report detailing one or more failures associated the recipe.

18. A computer-implemented method for transferring a target application to a second container orchestrator, using a snapshot of a resource state of the target application from a first container orchestrator, the computer-implemented method comprising:

executing a recipe to transfer the target application to the second container orchestrator, wherein the recipe includes an instruction to cause a change at the second container orchestrator relative to a resource involved in the transfer, the change comprising at least one of (i) changing a sequence in which the resource is restored, (ii) excluding an unrelated cluster information from a specification of the resource, (iii) changing a timing of restoration of the resource, and (iv) correcting a stale cluster information in the specification of the resource;

re-executing a plurality of recipes including the recipe, using the target application, one or more times on the second container orchestrator;

selecting at least one recipe in the plurality of recipes based on a determination that the at least one recipe in the plurality of recipes meets or exceeds a threshold for operation on the second container orchestrator; and confirming that the least one selected recipe in the plurality of recipes operates successfully on the second container orchestrator without failure.

19. The method of claim 18, wherein: the determination further comprises an assessment that none of the recipes in the plurality of recipes meets or exceeds the threshold for operation on the second container orchestrator and a report detailing one or more failures associated the plurality of recipes.

20. The method of claim 18, wherein: the executing a plurality of recipes to transfer the target application to the second container orchestrator further comprises at least one recipe of the plurality of recipes implementing at least one or more of a plurality of recipe operations: ordering, filtering, retrying, and filter cluster-specific info.

21. The method of claim 18, wherein: the selecting at least one recipe in the plurality of recipes based on the determination that the at least one recipe from the plurality of recipes meets or exceeds the threshold for operation on the second container orchestrator further comprises optimizing one or more steps of the least one selected recipe.

22. A computer usable program product comprising one or more computer readable storage media, and program instructions collectively stored on the one or more computer readable storage media, the program instructions executable by a processor to cause the processor to perform operations transferring a target application to a second container orchestrator using a snapshot of a resource state of the target application from a first container orchestrator comprising:

executing a recipe to transfer the target application to the second container orchestrator, wherein the recipe includes an instruction to cause a change at the second container orchestrator relative to a resource involved in the transfer, the change comprising at least one of (i) changing a sequence in which the resource is restored, (ii) excluding an unrelated cluster information from a specification of the resource, (iii) changing a timing of restoration of the resource, and (iv) correcting a stale cluster information in the specification of the resource;

re-executing a plurality of recipes including the recipe, using the target application, one or more times on the second container orchestrator;

selecting at least one recipe in the plurality of recipes based on a determination that the at least one recipe in the plurality of recipes meets or exceeds a threshold for operation on the second container orchestrator; and confirming that the least one selected recipe in the plurality of recipes operates successfully on the second container orchestrator without failure.

* * * * *